United States Patent
Bae et al.

(10) Patent No.: US 11,203,152 B2
(45) Date of Patent: Dec. 21, 2021

(54) NOZZLE ASSEMBLY AND 3D PRINTER COMPRISING THE SAME

(71) Applicant: LG Chem, Ltd., Seoul (KR)

(72) Inventors: Choong Man Bae, Daejeon (KR); Sang Bum Ahn, Daejeon (KR); Jin Kyu Lee, Daejeon (KR)

(73) Assignee: LG Chem, Ltd.

( * ) Notice: Subject to any disclaimer, the term of this patent is extended or adjusted under 35 U.S.C. 154(b) by 251 days.

(21) Appl. No.: 16/607,407

(22) PCT Filed: Apr. 25, 2018

(86) PCT No.: PCT/KR2018/004789
§ 371 (c)(1),
(2) Date: Oct. 23, 2019

(87) PCT Pub. No.: WO2018/199621
PCT Pub. Date: Nov. 1, 2018

(65) Prior Publication Data
US 2020/0130272 A1    Apr. 30, 2020

(30) Foreign Application Priority Data
Apr. 26, 2017    (KR) .......................... 10-2017-0053505

(51) Int. Cl.
*B29C 64/209*    (2017.01)
*B22F 10/10*    (2021.01)
(Continued)

(52) U.S. Cl.
CPC ............ *B29C 64/209* (2017.08); *B22F 10/10* (2021.01); *B29C 64/393* (2017.08); *B33Y 30/00* (2014.12);
(Continued)

(58) Field of Classification Search
CPC ..... B29C 64/209; B29C 64/393; B33Y 30/00; B33Y 50/02; B22F 10/10
See application file for complete search history.

(56) References Cited

U.S. PATENT DOCUMENTS 6,717,118 B2 * 4/2004 Pilavdzic ................ B29C 45/74
219/601
2015/0290861 A1    10/2015 Douglass et al.
(Continued)

FOREIGN PATENT DOCUMENTS

CN    104760287 A    7/2015
CN    205631395 U    10/2016
(Continued)

OTHER PUBLICATIONS

International Search Report in PCT/KR2018/004789, dated Jan. 9, 2019, 2 pages.
(Continued)

*Primary Examiner* — Joseph S Del Sole
*Assistant Examiner* — John Robitaille
(74) *Attorney, Agent, or Firm* — Lerner, David, Littenberg, Krumholz & Mentlik, LLP (57) ABSTRACT

A nozzle assembly comprising a housing, a nozzle disposed in the housing and connected to an ink supply part, a first coil, which is disposed in the housing, for generating a magnetic field when a power source is applied, a second coil disposed in the housing, disposed so as to surround the nozzle and the first coil and generating a magnetic field when a power source is applied, provided that at least one of the magnetic field effective area and the magnetic field intensity is different from that of the first coil, and a lift part for lifting the nozzle and the first and second coils, respectively, so as to be positioned in the housing or exposed to the outside of the housing.

17 Claims, 6 Drawing Sheets

(51) Int. Cl.
  *B33Y 30/00* (2015.01)
  *B33Y 50/02* (2015.01)
  *B29C 64/393* (2017.01)
  *B33Y 70/10* (2020.01)
  *B29K 101/10* (2006.01)
  *B29K 505/00* (2006.01)
  *B29K 509/02* (2006.01)

(52) U.S. Cl.
  CPC .......... *B33Y 50/02* (2014.12); *B29K 2101/10* (2013.01); *B29K 2505/00* (2013.01); *B29K 2509/02* (2013.01); *B29K 2995/0008* (2013.01); *B33Y 70/10* (2020.01)

(56) References Cited

U.S. PATENT DOCUMENTS

2015/0298393 A1   10/2015   Suarez
2017/0312849 A1*  11/2017   Yang .................... B33Y 30/00

FOREIGN PATENT DOCUMENTS

| JP | 2008-37084 A | | 2/2008 | |
|---|---|---|---|---|
| KR | 20090106749 A | | 10/2009 | |
| KR | 20120041040 A | | 4/2012 | |
| KR | 10-1518402 B | | 5/2015 | |
| KR | 20160112063 A | | 9/2016 | |
| KR | 20160136969 A | | 11/2016 | |
| KR | 1020160164670 | * | 12/2016 | ............. B29C 64/20 |
| KR | 20170004469 A | | 1/2017 | |
| WO | 2015155745 A1 | | 10/2015 | |
| WO | 2016178545 A1 | | 11/2016 | |

OTHER PUBLICATIONS

Chinese Search Report for Application No. 201880027761.2, dated Dec. 23, 2020, 9 pages.

* cited by examiner

NOZZLE ASSEMBLY AND 3D PRINTER COMPRISING THE SAME

CROSS-REFERENCE TO RELATED APPLICATIONS

The present application is a national phase entry under 35 U.S.C. § 371 of International Application No. PCT/KR2018/004789 filed Apr. 25, 2018, published in Korean, which claims priority from Korean Patent Application No. 10-2017-0053505 filed on Apr. 26, 2017, all of which are incorporated herein by reference.

TECHNICAL FIELD

The present invention relates to a nozzle assembly and a 3D printer comprising the same.

BACKGROUND ART

A 3D printer is a printer that outputs objects three-dimensionally and has various printing methods depending on ink materials.

A lamination processing method typified by the 3D printing method is proceeding with fused deposition modeling (FDM), stereolithography (SLA), selective laser sintering (SLS) and their modified forms.

Among the materials of the lamination processing method, in the case of metal or ink containing the metal, it takes a long time and the equipment is bulky and expensive.

Recently, there is an increasing demand for nozzle assemblies in which printing and curing processes can be performed efficiently.

DISCLOSURE

Technical Problem

It is a problem to be solved by the present invention to provide a nozzle assembly capable of efficiently performing printing, pre-curing, and curing processes, and a 3D printer comprising the same.

Technical Solution

To solve the above-described problem, according to one aspect of the present invention, there is provided a nozzle assembly comprising a housing, a nozzle disposed in the housing and connected to an ink supply, a first coil, which is disposed in the housing, configured to generate a first magnetic field when a power source is applied, and a second coil disposed in the housing, disposed so as to surround the nozzle and the first coil and configured to generate a second magnetic field when the power source is applied, at least one of an effective area or a field intensity of the second magnetic field is different from an effective area or a field intensity of the first magnetic field, respectively, and the nozzle and the first and second coils, are configured to be switchably positioned between being housed within the housing or exposed to an outside of the housing.

Also, according to another aspect of the present invention, there is provided a 3D printer comprising a nozzle assembly, an ink supply arranged to supply ink to the nozzle assembly, a transfer part configured to move the nozzle assembly, and a power supply configured to supply a power source to the nozzle assembly.

Here, the nozzle assembly comprises a nozzle disposed in the housing and connected to an ink supply, a first coil, which is disposed in the housing, configured to generate a first magnetic field when a power source is applied, and a second coil disposed in the housing, disposed so as to surround the nozzle and the first coil and configured to generate a second magnetic field when the power source is applied, at least one of an effective area or a field intensity of the second magnetic field is different from an effective area or a field intensity of the first magnetic field, respectively, and the nozzle and the first and second coils, are configured to be switchably positioned between being housed within the housing or exposed to an outside of the housing.

Advantageous Effects

As described above, the nozzle assembly related to at least one embodiment of the present invention and the 3D printer comprising the same have the following effects.

The nozzle, the small coil, and the large coil are accommodated in one housing, so that they have a compact structure, and it is possible to efficiently perform printing, pre-curing and curing processes.

DETAILED DESCRIPTION

Hereinafter, a nozzle assembly according to one embodiment of the present invention and a 3D printer comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

The term "control part" as used in the specification refers to a control device that processes at least one function or operation. The part may be implemented by hardware (e.g., one or more switches, one or more processors), software (e.g., one or more applications, one or more programs) or a combination thereof.

Figure 1:
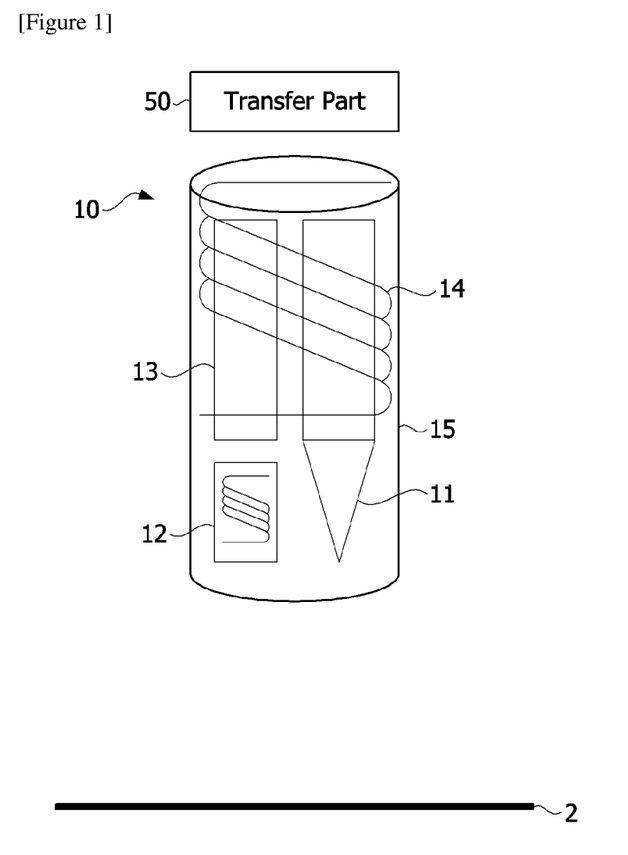
FIG. 1 is a conceptual diagram showing a nozzle assembly related to one embodiment of the present invention.
Figure 2:
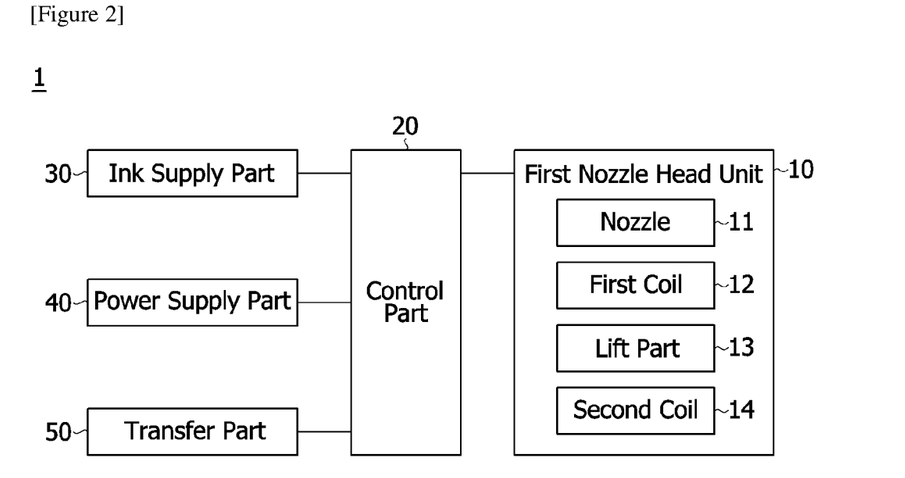
FIG. 2 is a configuration diagram showing a 3D printer related to one embodiment of the present invention.
Figure 3:
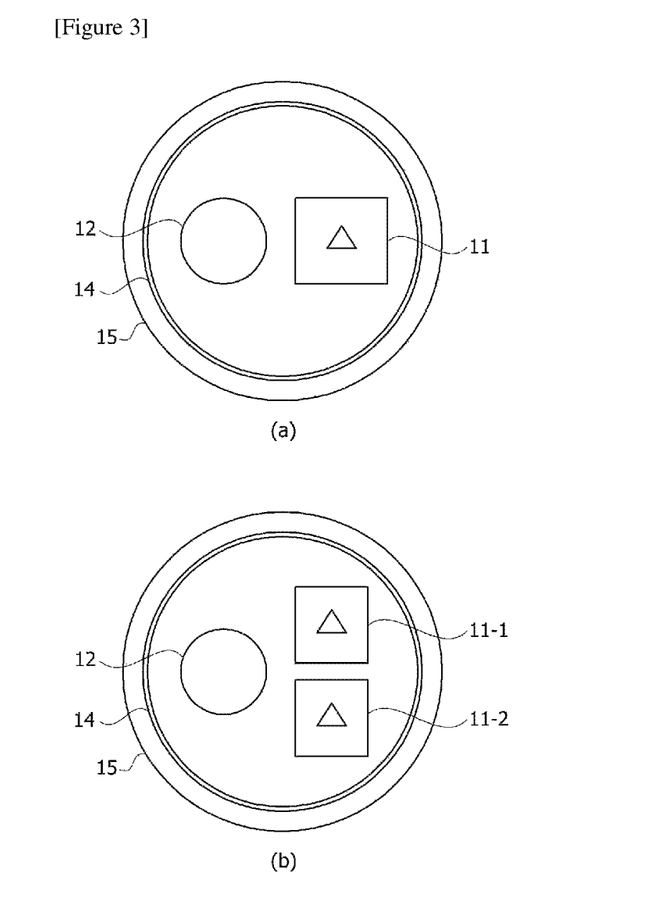
FIG. 3 is a view schematically showing a cross-section of a nozzle assembly.

FIG. 1 is a conceptual diagram showing a nozzle assembly (10) related to one embodiment of the present invention, FIG. 2 is a configuration diagram showing a 3D printer (1) related to one embodiment of the present invention, and also FIG. 3 is a view schematically showing a cross-section of a nozzle assembly.

Figure 4:
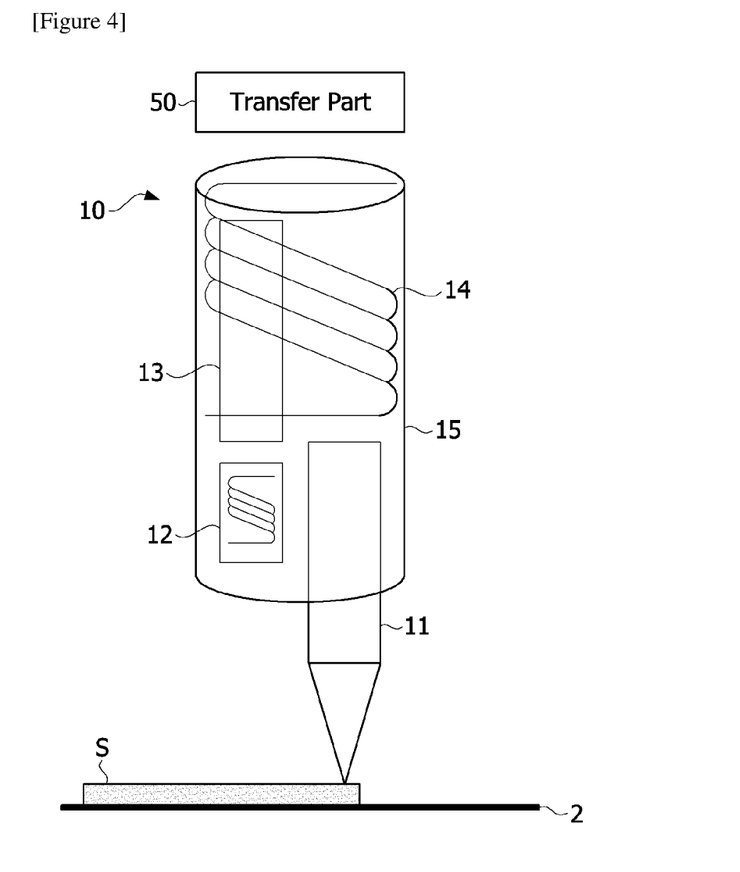
FIG. 4 is a conceptual diagram for explaining a printing process using a nozzle.
Figure 5:
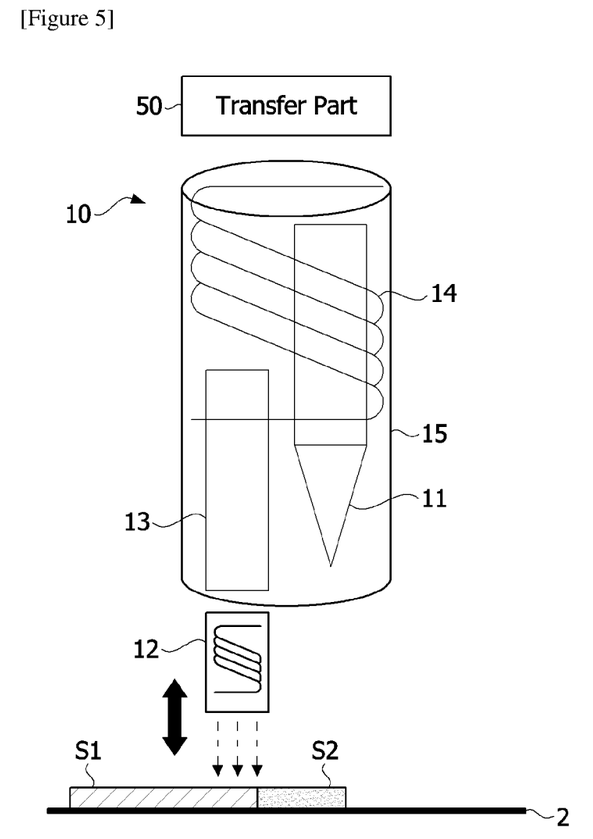
FIG. 5 is a conceptual diagram for explaining a primary curing process using a first coil.
Figure 6:
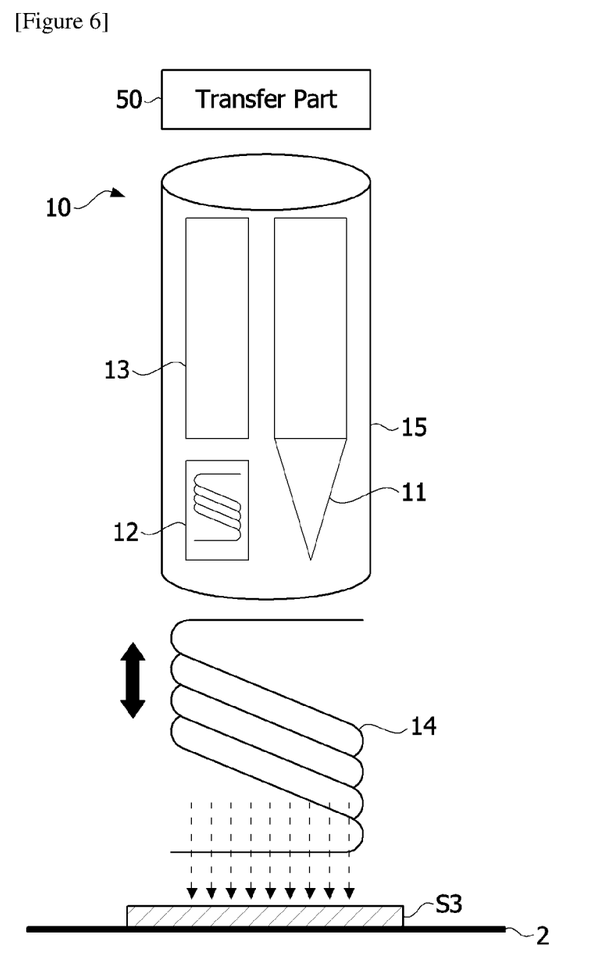
FIG. 6 is a conceptual diagram for explaining a secondary curing process using a second coil.

Furthermore, FIG. 4 is a conceptual diagram for explaining a printing process using a nozzle (11), FIG. 5 is a conceptual diagram for explaining a primary curing process using a first coil (12) and FIG. 6 is a conceptual diagram for explaining a secondary curing process using a second coil (14).

A 3D printer (1) related to one embodiment of the present invention comprises a nozzle assembly (10).

Referring to FIGS. 1 and 2, the 3D printer (1) related to one embodiment of the present invention comprises a nozzle assembly (10), an ink supply part (30) arranged to supply ink to the nozzle assembly (10), a transfer part (50) for moving the nozzle assembly (10) and a power supply part (40) for supplying a power source to the nozzle assembly (10). Also, the 3D printer (1) comprises a control part (20) for controlling the nozzle assembly (10), an ink supply flow rate, the power supply part (40) and the transfer part (50), respectively. In addition, the 3D printer (1) may comprise a base part (2) on which the ink ejected from the nozzle assembly (10) is seated.

The nozzle assembly (10) comprises a housing (15), a nozzle (11), a first coil (12), a second coil (14) and a lift part (13).

Also, the ink supply part (30) may be connected to the nozzle (11) of the nozzle assembly (10) and the ink may be stored in the ink supply part (30). Furthermore, the ink may comprise a nano-magnetic material, where the nano-magnetic material may comprise metal particles, metal oxide, or alloy particles. For example, the ink may also be a thermosetting resin ink or a thermosetting ceramic ink. Furthermore, the thermosetting resin ink may have a viscosity of 50,000 to 150,000 cp and may contain 5 wt % of a nano-magnetic material. In addition, the thermosetting ceramic ink may have a viscosity of 5,000 to 50,000 cp, and may contain 5 wt % of a nano-magnetic material and 40 to 80 wt % of alumina particles.

Referring to FIG. 1, the nozzle assembly (10) comprises a housing (15), a nozzle (11) disposed in the housing (15) and connected to an ink supply part (30), and a first coil (12), which is disposed in the housing (15), for generating a magnetic field when a power source is applied from a power supply part (40). Also, the nozzle assembly (10) comprises a second coil (14) disposed in the housing (15), disposed so as to surround the nozzle (11) and the first coil (12) and generating a magnetic field when a power source is applied, provided that at least one of the magnetic field effective area and the magnetic field intensity is different from that of the first coil (12). Furthermore, the nozzle assembly (10) comprises a lift part (13) for lifting the nozzle (11), the first and second coils (12, 14), respectively, so as to be positioned in the housing (15) or exposed to the outside of the housing (15).

The second coil (14) may be provided such that at least one of the magnetic field effective area and the magnetic field intensity is larger than that of the first coil (12). Also, the second coil (14) may have a length and a diameter larger than those of the first coil (12).

The first and second coils (12, 14) may be provided to form an alternate current electromagnetic field (focused electromagnetic field) on the ink (S) mounted on the base part (2). Also, the first and second coils (12, 14) may each comprise one or more coil structures. Here, the coil structure may have various structures such as a circular shape, a polygonal shape and a spiral shape. In addition, the shape and the number of the coil structure, and the arrangement between the coil structures may be variously determined. For example, the coil structure may have a cylindrical shape or a spiral shape. Furthermore, the coil structure may have a circular or rectangular coil shape.

Also, in the nozzle assembly (10), all the nozzle (11) and the first and second coils (12, 14) before an operation are in a state located inside the housing (15), and when at least one of the nozzle (11) and the first and second coils (12, 14) is exposed to the outside of the housing (15) for the operation, the remainder are located inside the housing (15). That is, ejection of the ink and curing of the ink are separately performed through the nozzle (11) and the first and second coils (12, 14) in a state exposed to the outside of the housing (15).

Specifically, the control part (20) performs control of the nozzle assembly, where the control part (20) may control so that the ink is ejected to the outside when the nozzle (11) is exposed to the outside of the housing (15) and the power source is supplied to the first coil (12) when the first coil (12) is exposed to the outside of the housing (15). Also, the control part (20) may be provided to position the nozzle (11) and the second coil (14) in the housing (15) when the first coil (12) is exposed to the outside of the housing (15). Furthermore, the control part (20) may be provided to position the nozzle (11) and the first coil (12) in the housing when the second coil (14) is exposed to the outside of the housing (15). In addition, the control part (20) is provided such that when the power source is supplied to one coil of the first and second coils (12, 14), the power source is not supplied to the other coil.

Also, the control part (20) may be provided to adjust the intensity, supply time, and frequency of the current applied to the first and second coils (12, 14).

Furthermore, the control part (20) is provided so that the ink (S) is ejected to the base part (2) side through the nozzle (11), a magnetic field is initially applied to the ink (S) through the first coil (12), and a magnetic field is subsequently applied to the ink through the second coil (14).

The first coil (12) performs primary curing (pre-curing) of the ink, and the second coil (14) performs secondary curing of the initially cured ink.

On the other hand, the second coil (14) is a coil relatively larger than the first coil (12), which starts to operate during forming fine patterns (after the structure is laminated to some extent) or after the lamination is completed and performs a function of applying a magnetic field so as to be a target curing as a whole. Also, referring to FIG. 5, the pre-curing means a curing to the extent that components of the ink are not completely cured but patterns are not collapsed and remain constant. In FIG. 5, S1 represents the ink which has been pre-cured by the first coil (12), and S2 represents the ink which is not pre-cured. In addition, when the lamination is brought into a pre-cured state, the activation remains in the laminated interface, so that upon the secondary curing by the secondary coil, the intensity characteristics at the contact surface are improved rather than the complete curing of the single coil. On the other hand, in FIG. 6, S3 represents the ink for which the pre-curing has been completed.

For example, the first coil (12) may be used for curing a narrow area of the structure, where the intensity of the magnetic field may be 1 mT to 40 mT, and the magnetic field effective area may be 10 μm to 500 μm. Also, the second coil (14) may be used for curing a large area of the structure, where the intensity of the magnetic field may be from 30 mT to 200 mT, and the magnetic field effective area may be from 10 mm to 1000 mm.

Also, the transfer part (70) may move the nozzle assembly (10) in various axial directions (x axis, y axis, z axis) and may be provided so that the gap between the base part (2) and the nozzle assembly (10) is adjusted. For example, the nozzle assembly (10) may be provided so as to be movable up and down with respect to the base part (2).

Furthermore, the power supply part (60) may supply, for example, a power source having a frequency of 100 kHz to 1 GHz and a current of 5 A to 500 A to the first and second coils (12, 14) separately. In addition, the power supply part (60) may supply a power source having different intensities to the first and second coils (12, 22) to generate magnetic fields of different intensities.

Besides, FIG. 3 shows a cross-sectional shape of the state that the nozzle assembly (10) shown in FIG. 1 is cut in the horizontal direction, where the nozzle assembly (10) may also be provided with a single nozzle (11) or a plurality of nozzles (11-1, 11-2).

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

The nozzle assembly related to at least one embodiment of the present invention and the 3D printer comprising the same can efficiently perform printing, pre-curing and curing processes.

The invention claimed is:

1. A nozzle assembly comprising:
a housing;
a nozzle disposed in the housing and connected to an ink supply;
a first coil, which is disposed in the housing, and configured to generate a first magnetic field when a power source is applied; and
a second coil disposed in the housing, disposed so as to surround the nozzle and the first coil and configured to generate a second magnetic field when the power source is applied,
wherein at least one of an effective area or a field intensity of the second magnetic field is different from an effective area or a field intensity of the first magnetic field, respectively; and
wherein the nozzle and the first and second coils, are configured to be switchably positioned between being housed within the housing or exposed to an outside of the housing.

2. The nozzle assembly according to claim 1,
wherein at least one of an effective area or a field intensity of the second magnetic field is larger than an effective area or a field intensity of the first magnetic field, respectively.

3. The nozzle assembly according to claim 1,
wherein the second coil has a length and a diameter larger than a length and diameter of the first coil, respectively.

4. The nozzle assembly according to claim 1,
further comprising a control part for controlling the nozzle assembly,
wherein the control part is configured to control the ink to be ejected out of the nozzle when the nozzle is exposed to an outside of the housing and the power source is supplied to the first coil when the first coil is exposed to the outside of the housing.

5. The nozzle assembly according to claim 4,
wherein the control part is configured to position the nozzle and the second coil within the housing when the first coil is exposed to the outside of the housing.

6. The nozzle assembly according to claim 5,
wherein the control part is configured to position the nozzle and the first coil in the housing when the second coil is exposed to the outside of the housing.

7. The nozzle assembly according to claim 4,
wherein the control part is configured to adjust an intensity, supply time, and frequency of a current applied to the first and second coils.

8. The nozzle assembly according to claim 1,
further comprising a plurality of nozzles disposed in the housing.

9. A 3D printer comprising:
a nozzle assembly;
an ink supply arranged to supply ink to the nozzle assembly;
a transfer part configured to move the nozzle assembly; and
a power supply configured to supply a power source to the nozzle assembly;
wherein the nozzle assembly comprises:
a housing;
a nozzle disposed in the housing and connected to the ink supply;
a first coil, which is disposed in the housing, and configured to generate a first magnetic field when a power source is applied;
a second coil disposed in the housing, disposed so as to surround the nozzle and the first coil and configured to generate a second magnetic field when the power source is applied, wherein at least one of an effective area or a field intensity of the second magnetic field is different from an effective area or a field intensity of the first magnetic field, respectively; and
wherein the nozzle and the first and second coils, are configured to be switchably positioned between being housed within the housing or exposed to an outside of the housing.

10. The 3D printer according to claim 9,
further comprising a control part configured to control the nozzle assembly, an ink supply flow rate, the power supply and the transfer part, respectively, wherein the control part is configured to control the ink to be ejected to a base side through the nozzle, wherein the first magnetic field is initially applied to the ink through the first coil, and wherein the second magnetic field is subsequently applied to the ink through the second coil.

11. The 3D printer according to claim 9,
wherein at least one of an effective area or a field intensity of the second magnetic field is larger than an effective area or a field intensity of the first magnetic field, respectively.

12. The 3D printer according to claim 11,
wherein the second coil has a length and a diameter larger than a length and diameter of the first coil, respectively.

13. The 3D printer according to claim 9,
further comprising a control part configured to control the nozzle assembly, an ink supply flow rate, the power supply and the transfer part, respectively, wherein the control part is configured to control the ink to be ejected out of the nozzle when the nozzle is exposed to an outside of the housing and the power source is supplied to the first coil when the first coil is exposed to the outside of the housing.

14. The 3D printer according to claim 13,
wherein the control part is configured to position the nozzle and the second coil within the housing when the first coil is exposed to the outside of the housing.
15. The 3D printer according to claim 13,
wherein the control part is configured to position the nozzle and the first coil in the housing when the second coil is exposed to the outside of the housing.
16. The 3D printer according to claim 14,
wherein the control part is configured to avoid the power source being supplied to one coil of the first and second coils when the power source is supplied to the other coil of the first and second coils.
17. The 3D printer according to claim 15,
wherein the control part is configured to avoid the power source being supplied to one coil of the first and second coils when the power source is supplied to the other coil of the first and second coils.

\* \* \* \* \*